US012744617B2

(12) United States Patent
Liang et al.

(10) Patent No.: US 12,744,617 B2
(45) Date of Patent: Sep. 22, 2026

(54) METHOD FOR ELIMINATING JAMMING BY OAM MODE QUADRATIC COORDINATION

(71) Applicant: Xidian University, Xian City (CN)

(72) Inventors: Liping Liang, Xian City (CN); Wenchi Cheng, Xian City (CN); Hailin Zhang, Xian City (CN); Bin Qiu, Xian City (CN)

(73) Assignee: Xidian University, Xian City (CN)

( * ) Notice: Subject to any disclaimer, the term of this patent is extended or adjusted under 35 U.S.C. 154(b) by 185 days.

(21) Appl. No.: 18/920,983

(22) Filed: Oct. 21, 2024

(65) Prior Publication Data

US 2025/0150195 A1 May 8, 2025

(51) Int. Cl.

| | |
|---|---|
| ***H04K 3/00*** | (2006.01) |
| ***H04B 1/713*** | (2011.01) |
| ***H04L 27/34*** | (2006.01) |

(52) U.S. Cl.

CPC ............... *H04K 3/25* (2013.01); *H04B 1/713* (2013.01); *H04L 27/3405* (2013.01)

(58) Field of Classification Search

CPC .......... H04K 3/228; H04K 3/25; H04B 1/713; H04L 27/3405

See application file for complete search history.

(56) References Cited

U.S. PATENT DOCUMENTS

| | | | | |
|---|---|---|---|---|
| 2015/0200704 A1* | 7/2015 | Graceffo | H04L 27/04 375/141 |
| 2016/0254897 A1* | 9/2016 | Berretta | H04L 5/02 375/267 |
| 2022/0123782 A1* | 4/2022 | Cheng | H04B 1/715 |
| 2025/0047323 A1* | 2/2025 | Xue | H04B 3/52 |

* cited by examiner

*Primary Examiner* — Nguyen T Vo

(74) *Attorney, Agent, or Firm* — Juneau & Mitchell; Todd L. Juneau

(57) ABSTRACT

A method for eliminating jamming by OAM mode quadratic coordination is disclosed, including: a transmitter selecting a primary OAM mode and secondary OAM modes; based on a group of keys and real-time time self-defined by the transmitter and the receiver respectively, generating via the transmitter, a mode quadratic collaborative transformation sequence, and based on a mode quadratic collaborative transformation sequence, dividing input binary information bits into OAM mode index information bits and signal modulation bits, and jointly designing a position distribution of their bits in an information frame structure; determining via the transmitter, G quadratic collaborative transformation OAM modes carrying constellation point symbols activated at each hop, loading them onto each array element of an antenna to obtain G mutually orthogonal OAM mode quadratic collaborative transformation signals y, transmitting the G mutually orthogonal OAM mode quadratic collaborative transformation signals y to the receiver.

9 Claims, 3 Drawing Sheets

Figure 1:
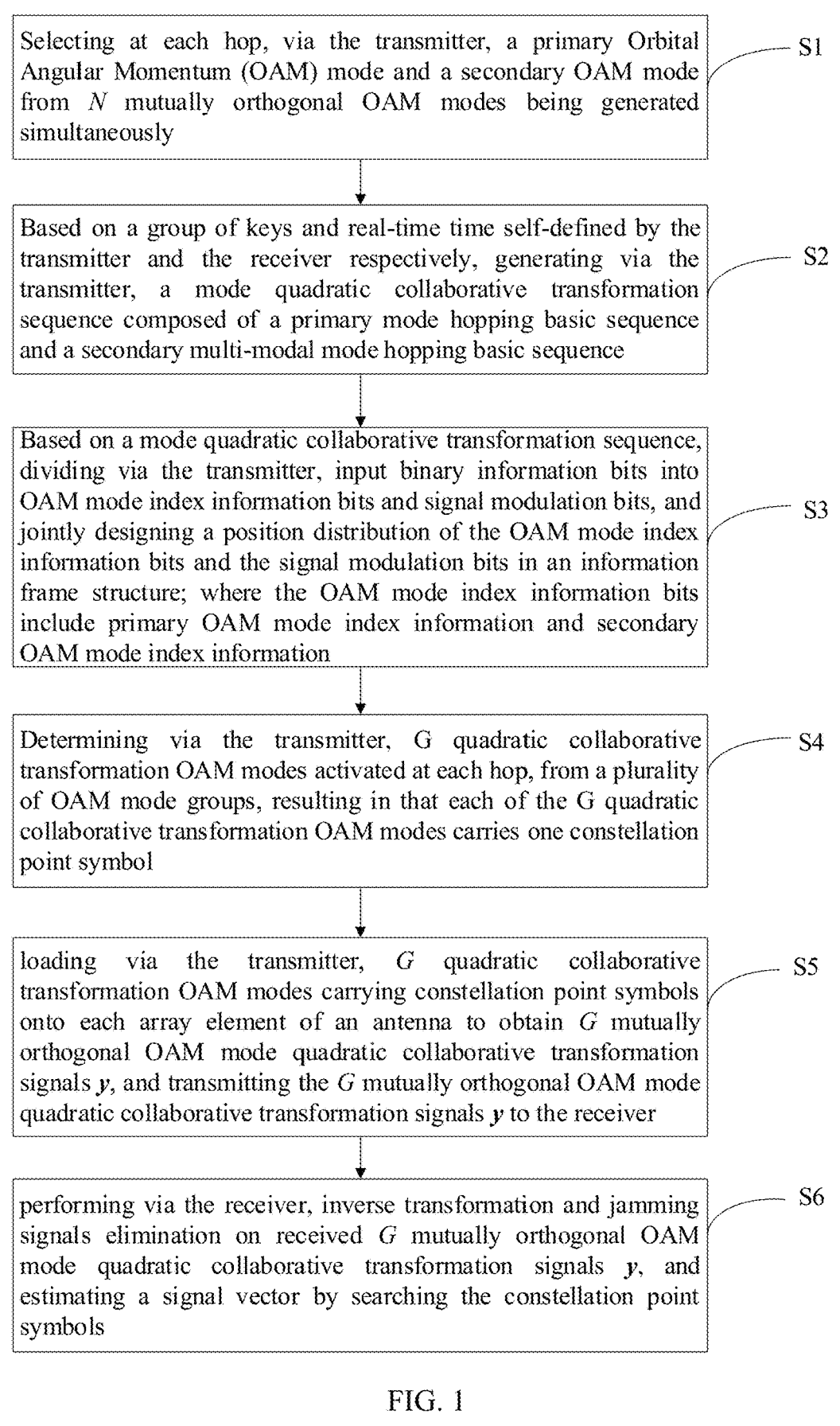

Selecting at each hop, via the transmitter, a primary Orbital Angular Momentum (OAM) mode and a secondary OAM mode from $N$ mutually orthogonal OAM modes being generated simultaneously

S1

Based on a group of keys and real-time time self-defined by the transmitter and the receiver respectively, generating via the transmitter, a mode quadratic collaborative transformation sequence composed of a primary mode hopping basic sequence and a secondary multi-modal mode hopping basic sequence

S2

Based on a mode quadratic collaborative transformation sequence, dividing via the transmitter, input binary information bits into OAM mode index information bits and signal modulation bits, and jointly designing a position distribution of the OAM mode index information bits and the signal modulation bits in an information frame structure; where the OAM mode index information bits include primary OAM mode index information and secondary OAM mode index information

S3

Determining via the transmitter, G quadratic collaborative transformation OAM modes activated at each hop, from a plurality of OAM mode groups, resulting in that each of the G quadratic collaborative transformation OAM modes carries one constellation point symbol

S4 loading via the transmitter, $G$ quadratic collaborative transformation OAM modes carrying constellation point symbols onto each array element of an antenna to obtain $G$ mutually orthogonal OAM mode quadratic collaborative transformation signals $\boldsymbol{y}$, and transmitting the $G$ mutually orthogonal OAM mode quadratic collaborative transformation signals $\boldsymbol{y}$ to the receiver

S5 performing via the receiver, inverse transformation and jamming signals elimination on received $G$ mutually orthogonal OAM mode quadratic collaborative transformation signals $\boldsymbol{y}$, and estimating a signal vector by searching the constellation point symbols

METHOD FOR ELIMINATING JAMMING BY OAM MODE QUADRATIC COORDINATION

CROSS-REFERENCE TO RELATED APPLICATIONS

This application is based on and claims the benefit of priority from Chinese Patent Application No. 202311468874.5, filed on Nov. 7, 2023, the entirety of which is incorporated by reference herein.

TECHNICAL FIELD

The present disclosure relates to a technical field of wireless communication, and in particular, to a method for eliminating jamming by orbital angular momentum (OAM) mode quadratic coordination.

BACKGROUND

Reliable information transmission can significantly improve the efficiency of modern wireless communications. The frequency hopping (FH) technique is widely applied in wireless communications due to its advantages of strong anti-jamming, low interception, and anti-fading. However, now the jamming environments become increasingly complicated, and the equipment is diversified and integrated. On this basis, the conventional FH techniques have formed a fierce contradiction between the anti-jamming performance and the limited spectrum resources, resulting in that it is difficult to significantly improve the anti-jamming performance of wireless communications. Therefore, it is urgent to deeply explore the physical characteristics of wireless electromagnetic waves and explore new anti-jamming technologies to meet the urgent demand for strong information attack and defense in wireless communications.

A linear angular momentum has been deeply explored to describe the polarization state of a beam. However, the research on OAM is still in an initial stage, it describes the front end of the spiral phase of electromagnetic waves. Electromagnetic waves carrying OAM are called as vortex electromagnetic waves. The "Utilization of Photon Orbital Angular Momentum in the Low-Frequency Radio Domain" has introduced the OAM to a microwave band and verified that vortex electromagnetic waves can be generated by phased array antennas, on this basis the application of vortex electromagnetic waves is started in wireless communications. In an ideal line-of-sight wireless communication scenario, OAM modes can theoretically be infinite due to the orthogonality among different integer OAM modes. Therefore, vortex electromagnetic waves have great potential for anti-jamming, low interception, and covert transmission without sacrificing spectrum resources.

In an existing technology, all OAM modes are used for information transmission and the confidentiality rate of the wireless communication system with multi-modes of vortex electromagnetic waves is calculated. It is assumed that the eavesdropper uses a uniform circular array with the same number of arrays to obtain legitimate information, and then uses the Fourier transform to recover the information. However, the disadvantage of this method is that the confidentiality rate is limited and it does not have anti-jamming capability.

In an existing technology, an anti-jamming method by mode hopping of vortex electromagnetic waves is proposed. The main idea is that: the transmitter quickly selects the OAM mode to hop according to the mode hopping sequence and the legitimate receiver can quickly obtain the OAM mode based on a pre-shared mode hopping sequence between the legitimate transceiver and the legitimate receiver. By using the orthogonality among different OAM modes, the purpose of efficiently suppressing jamming can be achieved. This method extends the anti-jamming method from the traditional frequency domain to the two-dimensional mode-frequency domain. Therefore, this method can enrich the diversity of signal transmission carriers of legitimate transceivers to significantly reduce the probability of being jammed, thus improving the anti-jamming capability of wireless communications.

In an existing technology, there is also an anti-jamming method of vortex electromagnetic waves based on index modulation. This method selects a hopping mode group of vortex electromagnetic waves by using index modulation information, so as to achieve signal diversity and multiplexing transmission. In the case of the legitimate transmitter and receiver being highly synchronized and sharing a key, the legitimate receiver can quickly determine the mode group of legitimate communication and suppress jamming by the Fourier transform. The main innovation of this method lies in that: on the one hand, it improves spectrum efficiencies by using subliminal capacity and meets the requirement of information exchange for each device; on the other hand, it improves the anti-jamming performance of wireless communications by using fast mode hopping.

However, the shortcomings of the above anti-jamming methods of vortex wave electromagnetic waves lie in that: the plane wave jamming will cause a certain degree of intra-mode crosstalk to the signal received by the legitimate receiver, resulting in the ability of the legitimate receiver to resist strong jamming is slightly insufficient. Therefore, how to solve the above problems and achieve high spectrum efficiencies by using OAM mode signals of vortex electromagnetic waves is an urgent technical problem.

SUMMARY

In order to solve the above-mentioned problems in the existing technologies, the present disclosure provides a method for eliminating jamming by Orbital Angular Momentum (OAM) mode quadratic coordination. The technical problems can be solved according to the following technical solutions.

The present disclosure provides a method for eliminating jamming by OAM mode quadratic coordination, applied to a wireless communication anti-jamming system including a transmitter and a receiver; and the method includes:

- selecting at each hop, via the transmitter, primary OAM modes and secondary OAM modes from N mutually orthogonal OAM modes being generated simultaneously;
- based on a group of keys and real-time time self-defined by the transmitter and the receiver respectively, generating via the transmitter, a mode quadratic collaborative transformation sequence composed of a primary mode hopping basic sequence and a secondary multiple mode hopping basic sequence;
- based on the mode quadratic collaborative transformation sequence, dividing via the transmitter, input binary information bits into OAM mode index information bits and signal modulation bits, and jointly designing a position distribution of the OAM mode index information bits and the signal modulation bits in an information frame structure;

determining via the transmitter, G quadratic collaborative transformation OAM modes activated at each hop, from a plurality of OAM mode groups, resulting in that each of the G quadratic collaborative transformation OAM modes carries one constellation point symbol;

loading via the transmitter, G quadratic collaborative transformation OAM modes carrying constellation point symbols onto each array element of an antenna to obtain G mutually orthogonal OAM mode quadratic collaborative transformation signals y, and transmitting the G mutually orthogonal OAM mode quadratic collaborative transformation signals y to the receiver; and performing via the receiver, inverse transformation and jamming signals elimination on received G mutually orthogonal OAM mode quadratic collaborative transformation signals y, and estimating a signal vector by searching the constellation point symbols.

In an embodiment of the present disclosure, the step of selecting at each hop, via the transmitter, the primary OAM modes and the secondary OAM modes from N mutually orthogonal OAM modes being generated simultaneously, includes:

selecting at each hop, via the transmitter, one OAM mode as the primary OAM mode from N mutually orthogonal OAM modes being generated simultaneously, and selecting G non-zero OAM modes as the secondary OAM mode.

In an embodiment of the present disclosure, the step of generating via the transmitter, a mode quadratic collaborative transformation sequence composed of a primary mode hopping basic sequence and a secondary multiple mode hopping basic sequence, based on a group of keys and real-time time self-defined by the transmitter and the receiver respectively, includes:

self-defining via the transmitter and the receiver, a group of keys and real-time time respectively;

taking via the transmitter, a key in one group as an encryption key of the primary OAM mode, and encrypting the real-time time in the one group as a plaintext, to obtain a primary mode hopping basic sequence $\Omega_1=\{c_t, t=1, 2, 3, \ldots\}$, $c_t$ represents a primary mode hopping basic sequence generated at a moment t;

taking via the transmitter, a key in another one group as an encryption key of the secondary OAM mode, and encrypting the real-time time in the another one group as a plaintext, to obtain the secondary multiple mode hopping basic sequence $\Omega_2=\{a_t, t=1, 2, 3, \ldots\}$, $a_t$ represents a secondary mode hopping basic sequence at a moment t; and combining via the transmitter, the primary mode hopping basic sequence and the secondary multiple mode hopping basic sequence, to obtain a mode quadratic collaborative transformation sequence.

In an embodiment of the present disclosure, the step of determining via the transmitter, G quadratic collaborative transformation OAM modes activated at each hop, from a plurality of OAM mode groups, resulting in that each of the G quadratic collaborative transformation OAM modes carries one constellation point symbol, includes:

selecting via the transmitter, an activated OAM mode quadratic collaborative transformation combination for each hop, to obtain each hop activated G quadratic collaborative transformation mode from $2^a$ OAM mode groups, where $$a=\left\lfloor \log_2\left(N\binom{N-1}{G}\right)\right\rfloor,$$

$\lfloor\square\rfloor$ represents floor function, $$\binom{N-1}{G}$$

represents selecting G binomial coefficients from N−1;

performing via the transmitter, M-order signal modulation by using the signal modulation bits, and mapping each $\log_2 M$ information bits to one constellation point symbol; and loading via the transmitter, the constellation point symbols onto the G quadratic collaborative transformation OAM modes respectively, resulting in that each of the G quadratic collaborative transformation OAM modes carries one constellation point symbol.

In an embodiment of the present disclosure, the $g^{th}$ quadratic collaborative transformation OAM mode carrying a constellation point symbol is $$s_g e^{j\frac{2\pi}{N}l_s l_g},$$

where $s_g$ represents a constellation point symbol carried onto the $g^{th}$ quadratic collaborative transformation OAM mode, $1\le g\le G$, j represents an imaginary unit, $l_s$ represents a selected primary OAM mode, $l_g$ represents a selected $g^{th}$ secondary OAM mode.

In an embodiment of the present disclosure, the step of loading via the transmitter, G quadratic collaborative transformation OAM modes carrying constellation point symbols onto each array element of an antenna to obtain G mutually orthogonal OAM mode quadratic collaborative transformation signals y, and transmitting the G mutually orthogonal OAM mode quadratic collaborative transformation signals y to the receiver, includes:

loading via the transmitter, the G quadratic collaborative transformation OAM modes carrying constellation point symbols onto all array elements of a uniform circular array antenna, to generate the G mutually orthogonal OAM mode quadratic collaborative transformation signals y, and further transmitting the G mutually orthogonal OAM mode quadratic collaborative transformation signals y to the receiver.

In an embodiment of the present disclosure, the step of performing via the receiver, inverse transformation and jamming signals elimination on received G mutually orthogonal OAM mode quadratic collaborative transformation signals y, and estimating a signal vector by searching the constellation point symbols, includes:

performing via the receiver, an inverse transformation operation on the received G mutually orthogonal OAM mode quadratic collaborative transformation signals y, and eliminating jamming for the received G mutually orthogonal OAM mode quadratic collaborative transformation signals y, to obtain signals $y_l$; and searching all constellation point symbols S of a M-order signal modulation, and estimating a signal vector.

In an embodiment of the present disclosure, the receiver performs an inverse transformation operation on the received G mutually orthogonal OAM mode quadratic collaborative transformation signals y, and eliminates jamming signals according to the following steps:

performing via the receiver, a Fourier transformation on the received G mutually orthogonal OAM mode quadratic collaborative transformation signals y, to obtain signals $\ddot{y}$:

$$\ddot{y} = F^{+} y;$$

where $F^{+}$ represents a Fourier transformation operator, the signal $\ddot{y}$ is an N-dimensional column vector, including G terms desired by the receiver and (N-G) terms undesired by the receiver;

based on the mode quadratic collaborative transformation sequence, extracting via the receiver, G terms of the signal $\ddot{y}$, to obtain signals $\tilde{y}$ with a dimension of G;

according to the primary OAM mode selected by the transmitter, performing via the receiver, an inverse primary mode transformation on the $g^{th}$ $\ddot{y}_g$ of the signal $\tilde{y}$, to obtain a signal $y_g$:

$$y_g = \frac{1}{N} \sum_{l_s=-\lfloor \frac{N}{2} \rfloor+1}^{\lfloor \frac{N}{2} \rfloor} \ddot{y}_g e^{-j\frac{2\pi}{N} l_s l_g};$$

eliminating via the receiver, an jamming signal in the signal $y_g$, to obtain a signal $y_l=[y_1, y_2, \ldots y_g, \ldots y_G]$.

In an embodiment of the present disclosure, the signal vector estimated by the receiver is:

$$\hat{s} = \arg\max_{s\hat{I} S} \ln f(y_l|H);$$

where $f(y_l|H)$ represents a probability density function of the signal $y_l$ in a case of a transmission channel matrix being H, and s represents a modulation signal vector transmitted by the transmitter.

Compared with the existing technologies, beneficial effects of the present disclosure are as follows.

Processing with large broadband and strong jamming, there are very limited frequency points that can be selected in the existing frequency hopping technology. It is more likely that all the frequency hopping points are covered by jamming, thus it is difficult to exert anti-jamming capabilities. Hence, the quality of wireless communication is reduced. In contrast, the present disclosure makes full use of the OAM modes (which belong to an orthogonal resource that is completely independent of the frequency domain) for suppression of deliberate jamming. On this basis, the co-frequency jamming can be suppressed according to conventional means such as band-pass filters. At the same time, the present disclosure constructs a new orthogonal phase factor for signal transmission by performing mode quadratic collaborative transformation at the transmitter; and quickly hops to the selected OAM mode group, so as to reduce the probability of being tracked by jamming. After the receiver performing a two-dimensional Fourier transformation for solving the mode quadratic collaborative transformation, the co-channel jamming can be adaptively returned to zero, so as to achieve information physical-layer deep protection in the OAM mode domain.

On the one hand, the present disclosure adopts OAM mode index information bits to determine the mode quadratic collaborative transformation group selected at each hop. The number of this part of the information bits determines the increased subliminal capacity of wireless communication. On the other hand, the present disclosure achieves multiplexing signals by utilizing a selection of a plurality of secondary modes for information transmission, and achieves transmitting a plurality of channels of different information, so as to achieve an object of improving spectrum efficiency. Therefore, the spectrum efficiency of the present disclosure is a sum of the subliminal capacity and the achievable spectrum efficiency of signal multiplexing, which is significantly higher than the spectrum efficiency in the existing technologies.

The present disclosure will be further described in detail hereinafter with reference to the accompanying drawings and the embodiments.

BRIEF DESCRIPTION OF DRAWINGS

FIG. 1 is a schematic flow chart of a method for eliminating jamming by OAM mode quadratic coordination provided by an embodiment of the present disclosure;

DETAILED DESCRIPTION

Figure 2:
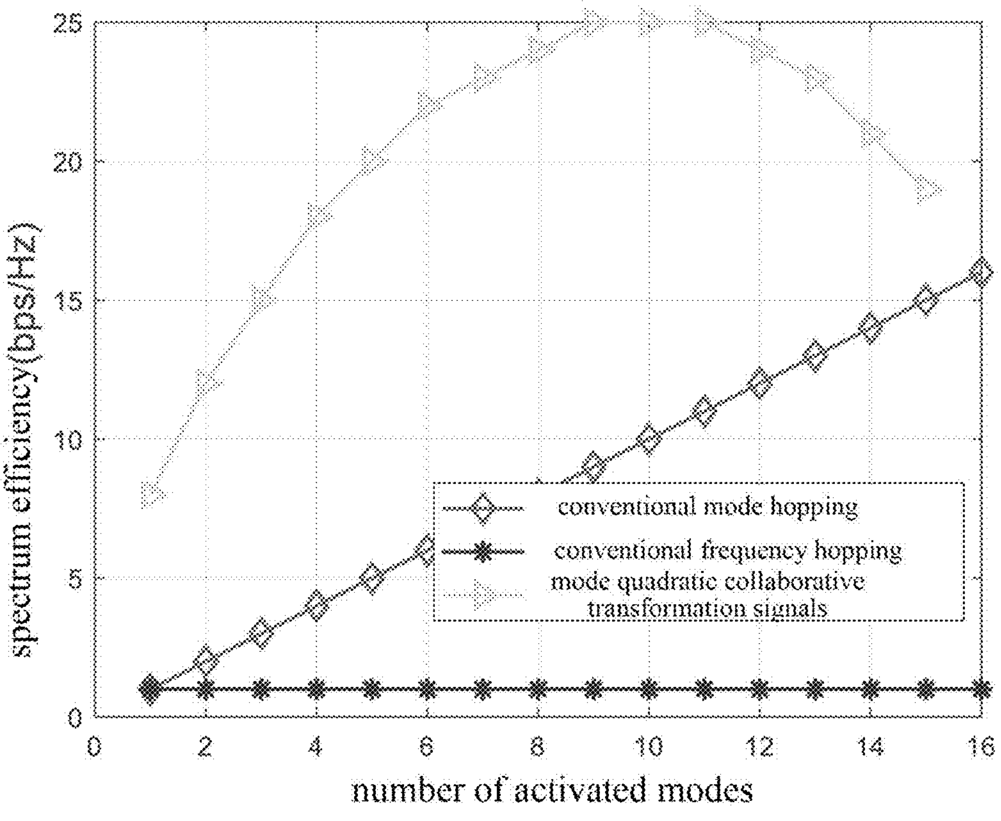
FIG. 2 is a comparative schematic diagram showing the spectrum efficiency versus the number of activated OAM modes provided by an embodiment of the present disclosure.

The present disclosure will be described in further detail herein, with reference to specific embodiments, but the implementations of the present disclosure are not limited thereto.

FIG. 1 is a schematic flow chart of a method for eliminating jamming by OAM mode quadratic coordination provided by an embodiment of the present disclosure. As shown in FIG. 1, an embodiment of the present disclosure provides a method for eliminating jamming by OAM mode quadratic coordination, applied to a wireless communication anti-jamming system including a transmitter and a receiver; the above method includes:

S1, selecting at each hop, via the transmitter, a primary Orbital Angular Momentum (OAM) mode and a secondary OAM mode from N mutually orthogonal OAM modes being generated simultaneously;

S2, based on a group of keys and real-time time self-defined by the transmitter and the receiver respectively, generating via the transmitter, a mode quadratic collaborative transformation sequence composed of a primary mode hopping basic sequence and a secondary multiple mode hopping basic sequence;

S3, based on a mode quadratic collaborative transformation sequence, dividing via the transmitter, input binary information bits into OAM mode index information bits and signal modulation bits, and jointly designing a position distribution of the OAM mode index information bits and the signal modulation bits in an information frame structure; where the OAM mode index information bits include primary OAM mode index information and secondary OAM mode index information;

S4, determining via the transmitter, G quadratic collaborative transformation OAM modes activated at each hop, from a plurality of OAM mode groups, resulting in that each of the G quadratic collaborative transformation OAM modes carries one constellation point symbol;

S5, loading via the transmitter, G quadratic collaborative transformation OAM modes carrying constellation point symbols onto each array element of an antenna to obtain G mutually orthogonal OAM mode quadratic collaborative transformation signals y, and transmitting the G mutually orthogonal OAM mode quadratic collaborative transformation signals y to the receiver; and S6, performing via the receiver, inverse transformation and jamming signals elimination on received G mutually orthogonal OAM mode quadratic collaborative transformation signals y, and estimating a signal vector by searching the constellation point symbols.

It should be understood that electromagnetic waves with a spiral phase front end are called vortex electromagnetic waves. Because the hostile jamming transmit antenna is not aligned with the legitimate receive antenna, the jamming signal transmitted in a form of planar electromagnetic waves/vortex electromagnetic waves will destroy the orthogonality among different OAM modes at the legitimate receiver, thereby causing severe intra-mode jamming and reducing the quality of wireless communications. Therefore, it is necessary to design a mode quadratic collaborative transformation method for the vortex electromagnetic waves, and to determine the vortex electromagnetic waves at each mode hopping, thereby providing a technical basis for subsequent jamming zeroing.

In an embodiment of the present disclosure, the step S1 includes:

selecting at each hop, via the transmitter, one OAM mode as the primary OAM mode from N mutually orthogonal OAM modes being generated simultaneously, and selecting G non-zero OAM modes as the secondary OAM mode.

Due to the multiplexing and de-multiplexing of vortex electromagnetic wave signals, the legitimate transmitter and the legitimate receiver in the present disclosure can generate mutually orthogonal vortex electromagnetic wave beams by means of a plurality of spiral phase plates, a single antenna fusion metasurface, a uniform circular array legitimate metasurface, multiple concentric circular arrays, etc. Specifically, the maximum number of OAM modes being generated the legitimate transmitter at the same time is N, and OAM modes can quickly hop according to the mode hopping sequence shared by the legitimate transmitter and the legitimate receiver in advance. In the present disclosure, at each hop, the legitimate transmitter firstly selects one OAM mode as the primary OAM mode from N OAM modes, so as to perform quadratic collaborative transformation with the secondary modes. Then, the legitimate transmitter selects G non-zero OAM modes as the secondary OAM modes from N−1 non-zero OAM modes for information multiplexing and transmission. The remaining (N−G) OAM modes are in a non-working state by default, and do not transmit any information.

It should be noted that: in the primary OAM mode selection process, each OAM mode has the same probability of being selected; and in the secondary OAM mode selection process, each non-zero OAM mode has the same probability of being selected.

In an embodiment of the present disclosure, the step S2 includes:

S201, self-defining via the transmitter and the receiver, a group of keys and real-time time respectively;

S202, taking via the transmitter, a key in one group as an encryption key of the primary OAM mode, and encrypting the real-time time in the one group as a plaintext, to obtain a primary mode hopping basic sequence $\Omega_1=\{c_t, t=1, 2, 3, \ldots\}$, $c_t$ represents a primary mode hopping basic sequence generated at a moment t;

S203, taking via the transmitter, a key in another one group as an encryption key of the secondary OAM mode, and encrypting the real-time time in the another one group as a plaintext, to obtain the secondary multiple mode hopping basic sequence $\Omega_2=\{a_t, t=1, 2, 3, \ldots\}$, $a_t$ represents a secondary mode hopping basic sequence at a moment t; and S204, combining via the transmitter, the primary mode hopping basic sequence and the secondary multiple mode hopping basic sequence, to obtain a mode quadratic collaborative transformation sequence.

Specifically, in Step S2, two groups of keys and real-time times self-defined by both the legitimate transmitter and the legitimate receiver for the vortex electromagnetic waves are used as an encryption key and a plaintext respectively. According to the "confusion" and "diffusion" criteria proposed by cryptographic design, a group of keys are used as an encryption key of the primary OAM mode herein. Group encryption iteration is performed on the plaintext in the group, thereby generating the secondary mode hopping basic sequence $\Omega_1=\{c_t, t=1, 2, 3, \ldots\}$, $c_t$ is a primary mode hopping basic sequence generated at a moment t, $c_t$ corresponds to all modes of an anti-jamming communication system of vortex electromagnetic waves.

Furthermore, another group of keys are used as an encryption key of the secondary OAM modes. Group encryption iteration is performed on a plaintext in the group, thereby generating the secondary multiple mode hopping basic sequence $\Omega_2=\{a_t, t=1, 2, 3, \ldots\}$, where the zero mode is in non-working state. It should be noted that, the keys relate to the generation of primary mode hopping basic sequence and the keys relate to the generation of the secondary mode hopping basic sequence can be the same or different.

Finally, combining the primary mode hopping basic sequence and the secondary mode hopping basic sequence, and generating OAM mode quadratic collaborative transformation sequence.

In an embodiment of the present disclosure, the step S4 includes:

S401, selecting at each hop, via the transmitter, an activated OAM mode quadratic collaborative transformation combination from $2^a$ OAM mode groups, to obtain each hop activated G quadratic collaborative transformation mode, where $$a=\left\lfloor \log_2\left(N\binom{N-1}{G}\right)\right\rfloor,$$

$\lfloor\square\rfloor$ represents floor function, $$\binom{N-1}{G}$$

represents selecting G binomial coefficients from N−1;

S402, performing via the transmitter, a M-order signal modulation by using the signal modulation bits, and mapping $\log_2 M$ information bits to one constellation point symbol; and

S403, loading via the transmitter, the constellation point symbols onto the G quadratic collaborative transformation OAM modes respectively, resulting in that each of the G quadratic collaborative transformation OAM modes carries one constellation point symbol.

In the embodiment, the legitimate transmitter firstly selects an activated OAM mode quadratic collaborative transformation combination for each hop from $2^a$ OAM mode groups. That is, there are G quadratic collaborative transformation OAM modes. Then, M-order signal modulation is performed by using the signal modulation bits, and $\log_2 M$ information bits are mapped to one constellation point symbol. According to a circumstance that the G OAM modes performs multiplexing transmission, each quadratic collaborative transformation OAM mode carries one constellation point symbol. On this basis, the number of inputted binary information bits is G $\log_2 M$. For example, the total number $\eta$ of binary information bits inputted by the legitimate transmitter at each hop is shown as follows:

$$\eta = \left\lfloor \log_2\left(N\binom{N-1}{G}\right)\right\rfloor + G\log_2 M.$$

Furthermore, achieving mode hopping by loading constellation point symbol mode, includes: loading constellation point symbols onto G quadratic collaborative transformation OAM modes respectively, to obtain the $g^{th}$ quadratic collaborative transformation OAM mode signal. In the present embodiment, the $g^{th}$ quadratic collaborative transformation OAM mode carrying a constellation point symbol is $$s_g e^{j\frac{2\pi}{N}l_s l_g},$$

where $s_g$ represents a constellation point symbol carried onto the $g^{th}$ quadratic collaborative transformation OAM mode, $1 \le g \le G$, j represents an imaginary unit, $l_s$ represents a selected primary OAM mode, $l_g$ represents a selected $g^{th}$ secondary OAM mode.

In an embodiment of the present disclosure, the step S5 includes:

loading via the transmitter, the G quadratic collaborative transformation OAM modes carrying constellation point symbols onto all array elements of a uniform circular array antenna, to generate G mutually orthogonal OAM mode quadratic collaborative transformation signals y, and further transmitting the G mutually orthogonal OAM mode quadratic collaborative transformation signals y to the receiver.

Specifically, the transmitter loads G quadratic collaborative transformation OAM modes carrying constellation point symbols onto all array elements of a uniform circular array antenna. The transmission signal on the $n^{th}$ transmitting array element can be represented as $$\sum_{g=1}^{G} s_g e^{j\frac{2\pi}{N}l_g(l_s+n)},$$

thereby generating the G mutually orthogonal OAM mode quadratic collaborative transformation signals y, and realizing the simultaneously hopping of G OAM mode quadratic collaborative transformation signals, where $1 \le g \le G$.

It should be noted that, the non-strict alignment of the legitimate transmitter and the legitimate receiver will lead to serious crosstalk problems among different OAM modes. The present disclosure performs beamforming on the legitimate transmitter and the legitimate receiver respectively, to construct an approximate circulant matrix, so as to mitigate the crosstalk among different OAM modes. The receiver with a uniform circular array finally obtains the received signal y. When the G mutually orthogonal OAM mode quadratic collaborative transformation signals y are transmitted through sparse multipath channels, the crosstalk among different OAM modes caused by sparse multipath transmission can be eliminated by phase compensation methods, ray tracing, orthogonal frequency division multiplexing, and other methods. Then, the receiver with a uniform circular array finally obtains the received signal y.

Therefore, the embodiment can be implemented in, but is not limited to, a scenario that the uniform circular array of legitimate transmitter is strictly aligned with the uniform circular array of legitimate receiver, and a scenario of line-of-sight channel transmission.

Furthermore, the step S6 includes:

performing via the receiver, an inverse transformation operation on the received G mutually orthogonal OAM mode quadratic collaborative transformation signals y, and eliminating jamming for the received G mutually orthogonal OAM mode quadratic collaborative transformation signals y, to obtain a signal $y_l$, and searching all constellation point symbols S of a M-order signal modulation, and estimating a signal vector.

Specifically, the receiver performs the inverse transformation operation on the received G mutually orthogonal OAM mode quadratic collaborative transformation signals y and eliminates jamming for the received G mutually orthogonal OAM mode quadratic collaborative transformation signals y according to the following steps:

performing via the receiver, a Fourier transformation on the received G mutually orthogonal OAM mode quadratic collaborative transformation signals y, to obtain signals $\ddot{y}$:

$$\ddot{y} = F^{+}y;$$

where $F^{+}$ represents a Fourier transformation operator, the signal $\ddot{y}$ is a N-dimensional column vector, including G terms desired by the receiver and (N-G) terms undesired by the receiver;

based on a mode quadratic collaborative transformation sequence, extracting via the receiver, G terms of the signal $\ddot{y}$, to obtain a signal $\tilde{y}$ with a dimension of G;

according to the primary OAM mode selected by the transmitter, performing via the receiver, inverse primary mode transformation on the $g^{th}$ $\ddot{y}_g$ of the signal $\tilde{y}$, to obtain a signal $y_g$:

$$y_g = \frac{1}{N}\sum_{l_s=-\left\lfloor\frac{N}{2}\right\rfloor+1}^{\left\lfloor\frac{N}{2}\right\rfloor} \ddot{y}_g e^{-j\frac{2\pi}{N}l_s l_g};$$

eliminating via the receiver, an jamming signal in the signal $y_g$, to obtain a signal $y_l[y_1, y_2, \ldots y_g, \ldots y_G]$.

In the present embodiment, the receiver firstly performs a Fourier transformation on the received G mutually orthogonal OAM mode quadratic collaborative transformation signals y by using mode orthogonality, to obtain a signal ÿ, which is expressed as follows:

$$\ddot{y} = F^{+} y;$$

where $F^{+}$ represents a Fourier transformation operator.

During the Fourier transformation process, the receiver converts the received jamming signal from plane electromagnetic waves/vortex electromagnetic waves into plane electromagnetic waves. It should be noted that, the obtained signal ÿ is an N-dimensional column vector, including G terms desired by the receiver and (N-G) terms undesired by the receiver. Based on a determined mode quadratic collaborative transformation sequence from the transmitter, the receiver correspondingly extracts G terms of the signal ÿ, to obtain signals ỹ with a dimension of G.

Next, the $g^{th}$ item of the signal ỹ is defined as $\ddot{y}_g$, the receiver performs an inverse primary mode transformation processing on $\ddot{y}_g$ according to a primary mode selected by the transmitter, to obtain a signal $y_g$:

$$y_g = \frac{1}{N} \sum_{l_s=-\lfloor \frac{N}{2} \rfloor+1}^{\lfloor \frac{N}{2} \rfloor} \ddot{y}_g e^{-j\frac{2\pi}{N} l_s l_g}.$$

Because the primary mode does not select the zero mode, that is, $l_s \neq 0$, the inverse primary mode transformation can adaptively return the jamming signal to zero, to obtain a signal $y_l = [y_1, y_2, \ldots y_g, \ldots y_G]$.

Since the legitimate transmitter and the legitimate receiver are strictly synchronized, the receiver can determine the primary OAM mode and the secondary OAM modes activated by the transmitter. That is, there is no need to estimate the input OAM mode index information bits. Also, the maximum likelihood detection method can be used to estimate the transmission symbol. By searching for all signal constellation points S of M-order signal modulation, the estimated signal vector ŝ can be obtained as follows:

$$\hat{s} = \arg\max_{s \in S} \ln f(y_l | H);$$

where $f(y_l|H)$ represents a probability density function of the signal $y_l$ in a case of a transmission channel matrix being H, and s represents a modulation signal vector transmitted by the transmitter, S represents all constellation point symbols of M-order signal modulation.

Finally, the average bit error rate represented as $P_e$ can be obtained according to the joint boundary algorithm:

$$P_e \leq \sum_{s}^{2^{\eta_s}} \sum_{\hat{s}}^{2^{\eta_s}} \frac{P(s \longrightarrow \hat{s}) N_e(s, \hat{s})}{\eta 2^{\eta_s}};$$

where P(s®ŝ) represents a pairwise error probability when the transmitted signal is s but the estimated signal vector is ŝ; $N_e(s,\hat{s})$ represents the number of erroneously transmitted bits caused by the event (s®ŝ), the event (s®ŝ) represents the transmitted signal is s but the estimated signal vector is ŝ; $\eta_s = G \log_2 M$ is the number of information modulation bits.

Next, the method for eliminating jamming by OAM mode quadratic coordination provided by the present disclosure will be further explained according to numerical simulations.

During the simulation process, the signal modulation method is binary phase shift keying, the transmission power on each activated OAM mode is the same, and the power of received jamming signal is 2 dB. The spacing distances between adjacent array elements on the legitimate transmit and receive uniform circular array antenna are equal to a carrier wavelength, respectively. The channel bandwidth is set to 15 kHz.

Under the above conditions, the bit error rate and the spectrum efficiency are simulated respectively for the methods for eliminating jamming by OAM mode quadratic coordination provided by the present disclosure, the existing mode hopping anti-jamming method for vortex electromagnetic waves, and the narrowband multiple-input multiple-output (MIMO) method.

FIG. 2 is a comparative schematic diagram showing the spectrum efficiency versus the number of activated OAM modes provided by an embodiment of the present disclosure. The spectrum efficiency of the jamming elimination method by OAM mode quadratic coordination provided by the present disclosure, the spectrum efficiency of the existing mode hopping anti-jamming method for vortex electromagnetic waves, and the spectrum efficiency of the existing frequency hopping anti-jamming method are compared with each other. The spectrum efficiency is equal to the communication capacity divided by the channel bandwidth. In the simulation, the total number of available OAM modes is assumed to be 16. As shown in FIG. 2, with an increase of the number N of activated OAM modes, the spectrum efficiency of the present disclosure enhances due to the increasing of index information. The main reason for this phenomenon is that a message of the mode hopping technology for vortex electromagnetic waves is only transmitted according to information modulation. In addition, with an increase of the number of activated OAM modes, the spectrum efficiency of the present disclosure first rapidly increases to one maximum value and then decreases. When a few OAM modes are activated for information transmission, the index information plays a dominant role on the total number of transmission bits. When the number of OAM modes corresponding to the maximum spectrum efficiency is exceeded, the increase in information modulation is lower than the decrease in index information, resulting in a reduction in spectrum efficiencies. Due to the mode quadratic collaborative transformation of modes, the spectrum efficiency of the present disclosure is the highest among the three methods.

Figure 3:
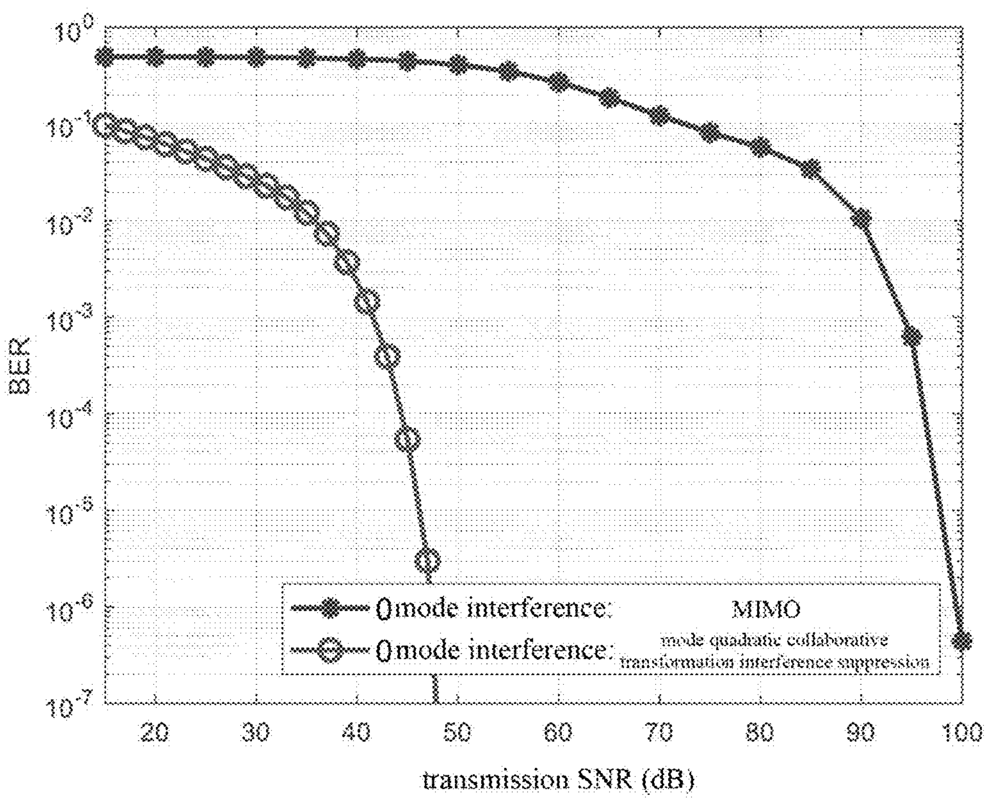
FIG. 3 is a comparative schematic diagram of Bit Error Rates provided by an embodiment of the present disclosure.

FIG. 3 is a comparative schematic diagram of Bit Error Rates (BER) versus the signal-to noise ratio (SNR) provided by an embodiment of the present disclosure. The Bit Error Rates of the jamming elimination method by OAM mode quadratic coordination provided by the present disclosure are compared with the Bit Error Rates of the MIMO method. In the simulation, it is assumed that the total number of available OAM modes is N=16. That is, the number of transmit antenna elements is 16. By observing the changing trend of the bit error rate curve, it can be intuitively found that the present disclosure has a lower bit error rate. As compared to the other method, the present disclosure not only has the lower ratio of bit errors to the total transmitted bits, but also successfully avoids the jamming attacks to useful signals.

Descriptions of the terms "one embodiment", "some embodiments", "an example", "a specific example" or "some examples" or the like means that specific features, structures, materials or characteristics described in an embodiment or example can be included in at least one of other embodiments or examples of the present disclosure. In this description, the schematic expressions of the above terms are not necessarily directed to the same embodiment or example. Furthermore, the described specific features, structures, materials or characteristics can be combined in any suitable manner in any one or more embodiments or examples. Furthermore, those skilled in the art can combine the different embodiments or examples described in the present disclosure without creative effort.

The above content is a further detailed description of the present disclosure in combination with specific preferred embodiments. And it cannot be concluded that the specific implementations of the present disclosure are limited to these descriptions. For those of ordinary skilled in the art, several simple deductions or substitutions can be made without departing from the concept of the present disclosure. Both the simple deductions and substitutions should be regarded as belonging to the protection scope of the present disclosure.

The invention claimed is:

1. A method for eliminating jamming by OAM mode quadratic coordination, applied to a wireless communication anti-jamming system comprising a transmitter and a receiver; the method comprises:

selecting at each hop, via the transmitter, a primary Orbital Angular Momentum (OAM) mode and a secondary OAM mode from N mutually orthogonal OAM modes being generated simultaneously;

generating via the transmitter, a mode quadratic collaborative transformation sequence composed of a primary mode hopping basic sequence and a secondary multiple mode hopping basic sequence, based on a group of keys and real-time time self-defined by the transmitter and the receiver respectively;

dividing via the transmitter, input binary information bits into OAM mode index information bits and signal modulation bits, and jointly designing a position distribution of the OAM mode index information bits and the signal modulation bits in an information frame structure, based on the mode quadratic collaborative transformation sequence;

determining via the transmitter, G quadratic collaborative transformation OAM modes activated at each hop, from a plurality of OAM mode groups, wherein each of the G quadratic collaborative transformation OAM modes carries one constellation point symbol;

loading via the transmitter, G quadratic collaborative transformation OAM modes carrying constellation point symbols onto each array element of an antenna to obtain G mutually orthogonal OAM mode quadratic collaborative transformation signals y, and transmitting the G mutually orthogonal OAM mode quadratic collaborative transformation signals y to the receiver; and performing via the receiver, inverse transformation and jamming signals elimination on received G mutually orthogonal OAM mode quadratic collaborative transformation signals y, and estimating a signal vector by searching the constellation point symbols.

2. The method for eliminating jamming by OAM mode quadratic coordination according to claim 1, the step of selecting at each hop, via the transmitter, the primary OAM mode and the secondary OAM mode from N mutually orthogonal Orbital Angular Momentum OAM modes being generated simultaneously, comprises:

selecting at each hop, via the transmitter, one OAM mode as the primary OAM mode from N mutually orthogonal OAM modes being generated simultaneously, and selecting G non-zero OAM modes as the secondary OAM mode.

3. The method for eliminating jamming by OAM mode quadratic coordination according to claim 1, the step of generating via the transmitter, the mode quadratic collaborative transformation sequence composed of the primary mode hopping basic sequence and the secondary multiple mode hopping basic sequence, based on a group of keys and real-time time self-defined by the transmitter and the receiver respectively, comprises:

self-defining via the transmitter and the receiver, a group of keys and real-time time respectively;

taking via the transmitter, a key in one group as an encryption key of the primary OAM mode, and encrypting the real-time time in the one group as a plaintext, to obtain a primary mode hopping basic sequence $\Omega_1=\{c_t, t=1, 2, 3, \ldots\}$, $c_t$ represents a primary mode hopping basic sequence generated at a moment t;

taking via the transmitter, a key in another one group as an encryption key of the secondary OAM mode, and encrypting the real-time time in the another one group as a plaintext, to obtain the secondary multiple mode hopping basic sequence $\Omega_2=\{a_t, t=1, 2, 3, \ldots\}$, $a_t$ represents a secondary mode hopping basic sequence at a moment t; and combining via the transmitter, the primary mode hopping basic sequence and the secondary multiple mode hopping basic sequence, to obtain a mode quadratic collaborative transformation sequence.

4. The method for eliminating jamming by OAM mode quadratic coordination according to claim 1, wherein the step of determining via the transmitter, G quadratic collaborative transformation OAM modes activated at each hop, from a plurality of OAM mode groups, resulting in that each of the G quadratic collaborative transformation OAM modes carries one constellation point symbol, comprises:

selecting via the transmitter, an activated OAM mode quadratic collaborative transformation combination for each hop from $2^a$ OAM mode groups, to obtain each hop activated G quadratic collaborative transformation mode, wherein $$a=\left\lfloor \log_2\left(N\binom{N-1}{G}\right)\right\rfloor,$$

$\lfloor\square\rfloor$ represents floor function, $$\binom{N-1}{G}$$

represents selecting G binomial coefficients from N−1;

performing via the transmitter, M-order signal modulation by using the signal modulation bits, and mapping $\log_2 M$ information bits to one constellation point symbol; and loading via the transmitter, the constellation point symbols onto the G quadratic collaborative transformation OAM modes respectively, resulting in that each of the G quadratic collaborative transformation OAM modes carries one constellation point symbol.

5. The method for eliminating jamming by OAM mode quadratic coordination according to claim 4, wherein the $g^{th}$ quadratic collaborative transformation OAM mode carrying a constellation point symbol is $$s_g e^{j\frac{2\pi}{N} l_s l_g},$$

wherein $s_g$ represents a constellation point symbol carried onto the $g^{th}$ quadratic collaborative transformation OAM mode, $1 \leq g \leq G$, j represents an imaginary unit, $l_s$ represents a selected primary OAM mode, $l_g$ represents a selected $g^{th}$ secondary OAM mode.

6. The method for eliminating jamming by OAM mode quadratic coordination according to claim 1, wherein the step of loading via the transmitter, G quadratic collaborative transformation OAM modes carrying constellation point symbols onto each array element of an antenna to obtain G mutually orthogonal OAM mode quadratic collaborative transformation signals y, and transmitting the G mutually orthogonal OAM mode quadratic collaborative transformation signals y to the receiver, comprises:

loading via the transmitter, the G quadratic collaborative transformation OAM modes carrying constellation point symbols onto all array elements of a uniform circular array antenna, to generate the G mutually orthogonal OAM mode quadratic collaborative transformation signals y, and further transmitting the G mutually orthogonal OAM mode quadratic collaborative transformation signals y to the receiver.

7. The method for eliminating jamming by OAM mode quadratic coordination according to claim 6, wherein the step of performing via the receiver, inverse transformation and jamming signals elimination on received G mutually orthogonal OAM mode quadratic collaborative transformation signals y, and estimating a signal vector by searching the constellation point symbols, comprises:

performing via the receiver, an inverse transformation operation on the received G mutually orthogonal OAM mode quadratic collaborative transformation signals y, and eliminating jamming for the received G mutually orthogonal OAM mode quadratic collaborative transformation signals y, to obtain a signal $y_l$, and searching all constellation point symbols S of a M-order signal modulation, and estimating a signal vector.

8. The method for eliminating jamming by OAM mode quadratic coordination according to claim 7, wherein the receiver performs an inverse transformation operation on the received G mutually orthogonal OAM mode quadratic collaborative transformation signals y, and eliminates jamming signals according to the following steps:

performing via the receiver, a Fourier transformation on the received G mutually orthogonal OAM mode quadratic collaborative transformation signals y, to obtain a signal $\ddot{y}$:

$$\ddot{y} = F^{+} y;$$

wherein $F^{+}$ represents a Fourier transformation operator, the signal $\ddot{y}$ is a N-dimensional column vector, comprising G terms desired by the receiver and (N−G) terms undesired by the receiver;

based on the mode quadratic collaborative transformation sequence, extracting via the receiver, G terms of the signal $\ddot{y}$, to obtain a signal $\tilde{y}$ with a dimension of G;

according to the primary OAM mode selected by the transmitter, performing via the receiver, an inverse primary mode transformation on the $g^{th}$ $\ddot{y}_g$ of the signal $\tilde{y}$ to obtain a signal $y_g$:

$$y_g = \frac{1}{N} \sum_{l_s=-\lfloor \frac{N}{2} \rfloor+1}^{\lfloor \frac{N}{2} \rfloor} \ddot{y}_g e^{-j\frac{2\pi}{N} l_s l_g};$$

and eliminating via the receiver, an jamming signal in the signal $y_g$, to obtain a signal $y_l=[y_1, y_2, \ldots y_g, \ldots y_G]$.

9. The method for eliminating jamming by OAM mode quadratic coordination according to claim 8, wherein the signal vector estimated by the receiver is:

$$\hat{s} = \arg\max_{s \hat{I} S} \ln f(y_l|H);$$

wherein $f(y_l|H)$ represents a probability density function of the signal $y_l$ in a case of a transmission channel matrix being H, and s represents a modulation signal vector transmitted by the transmitter.

* * * * *